United States Patent
Garbagnati et al.

(10) Patent No.: US 11,713,195 B2
(45) Date of Patent: Aug. 1, 2023

(54) ROLLER MODULAR CONVEYOR BELT MODULE AND MODULAR CONVEYOR BELT FORMED BY A PLURALITY OF SUCH MODULES

(71) Applicant: REGINA CATENE CALIBRATE S.P.A., Milan (IT)

(72) Inventors: Carlo Garbagnati, Castello di Brianza (IT); Norberto Cattaneo, Usmate Velate (IT)

(73) Assignee: REGINA CATENE CALIBRATE S.P.A., Milan (IT)

( * ) Notice: Subject to any disclaimer, the term of this patent is extended or adjusted under 35 U.S.C. 154(b) by 0 days.

(21) Appl. No.: 17/537,041

(22) Filed: Nov. 29, 2021

(65) Prior Publication Data
US 2022/0169448 A1 Jun. 2, 2022

(30) Foreign Application Priority Data
Nov. 30, 2020 (IT) ........................ 102020000029087

(51) Int. Cl.
*B65G 17/24* (2006.01)
*B65G 17/06* (2006.01)
(Continued)

(52) U.S. Cl.
CPC ........... *B65G 17/24* (2013.01); *B65G 17/067* (2013.01); *B65G 17/08* (2013.01); *B65G 17/083* (2013.01); *B65G 39/20* (2013.01); *B65G 2207/30* (2013.01)

(58) Field of Classification Search
CPC ...... B65G 17/24; B65G 17/067; B65G 17/08; B65G 17/083; B65G 39/20;
(Continued)

(56) References Cited

U.S. PATENT DOCUMENTS 3,245,517 A  4/1966 Ward
3,674,130 A  7/1972 Carmichael
(Continued)

FOREIGN PATENT DOCUMENTS

BR  PI0417612 A   4/2007
EP   1842806 A1  10/2007
(Continued)

OTHER PUBLICATIONS

Written Opinion dated Sep. 12, 2021 re: Application No. PCT/NL2021/050358, pp. 1-10, citing: US 2005/126896 A1, U.S. Pat No. 3,674,130 A, EP 1 842 806 A1, EP 3 612 474 A1, WO 2010/124719 A1, U.S. Pat. No. 3,245,517 A and US 2011/0056807 A1.

*Primary Examiner* — Mark A Deuble
(74) *Attorney, Agent, or Firm* — Cantor Colburn LLP

(57) ABSTRACT

A roller modular conveyor belt module for motorized continuous conveyors includes, first and second hinge elements extending from a main body along opposite directions orthogonal to the first direction and spaced from each other. Each of the hinge elements has a through hole with axis parallel to the first direction and being coaxial to each other to receive a respective hinge pin. The first hinge elements are adapted to interpose to second hinge elements of another module with through holes coaxial to each other to receive a hinge pin articulating therebetween. In the space between adjacent hinge elements, there is at least one roller passed through by an axial hole arranged coaxially with the through holes of the adjacent hinge elements delimiting the space. The module includes at least one bushing having an end portion inserted in the through hole, and extending through the roller axial hole.

15 Claims, 8 Drawing Sheets

(51) Int. Cl.
*B65G 39/20* (2006.01)
*B65G 17/08* (2006.01)

(58) Field of Classification Search
CPC .... B65G 2207/30; B65G 17/32; B65G 17/40; B65G 15/30; B65G 15/52
See application file for complete search history.

(56) References Cited

U.S. PATENT DOCUMENTS

| | | | | |
|---|---|---|---|---|
| 5,224,583 | A * | 7/1993 | Palmaer | B65G 17/086 198/779 |
| 6,364,095 | B1 * | 4/2002 | Layne | B65G 21/22 198/852 |
| 7,527,146 | B2 | 5/2009 | Stebnicki et al. | |
| 7,775,345 | B2 * | 8/2010 | Fourney | B65G 47/266 198/779 |
| 9,969,556 | B2 * | 5/2018 | Andersen | B65G 17/40 |
| 10,065,802 | B1 | 9/2018 | Chen | |
| 10,661,996 | B2 * | 5/2020 | Balsells Mercade | B65G 17/08 |
| 2005/0126896 | A1 | 6/2005 | Wieting et al. | |
| 2011/0056807 | A1 | 3/2011 | Fourney | |

FOREIGN PATENT DOCUMENTS

| | | | |
|---|---|---|---|
| EP | 3612474 | A1 | 2/2020 |
| WO | 2010124719 | A1 | 11/2010 |
| WO | 2018194828 | A1 | 10/2018 |
| WO | 2021246874 | A1 | 12/2021 |

* cited by examiner

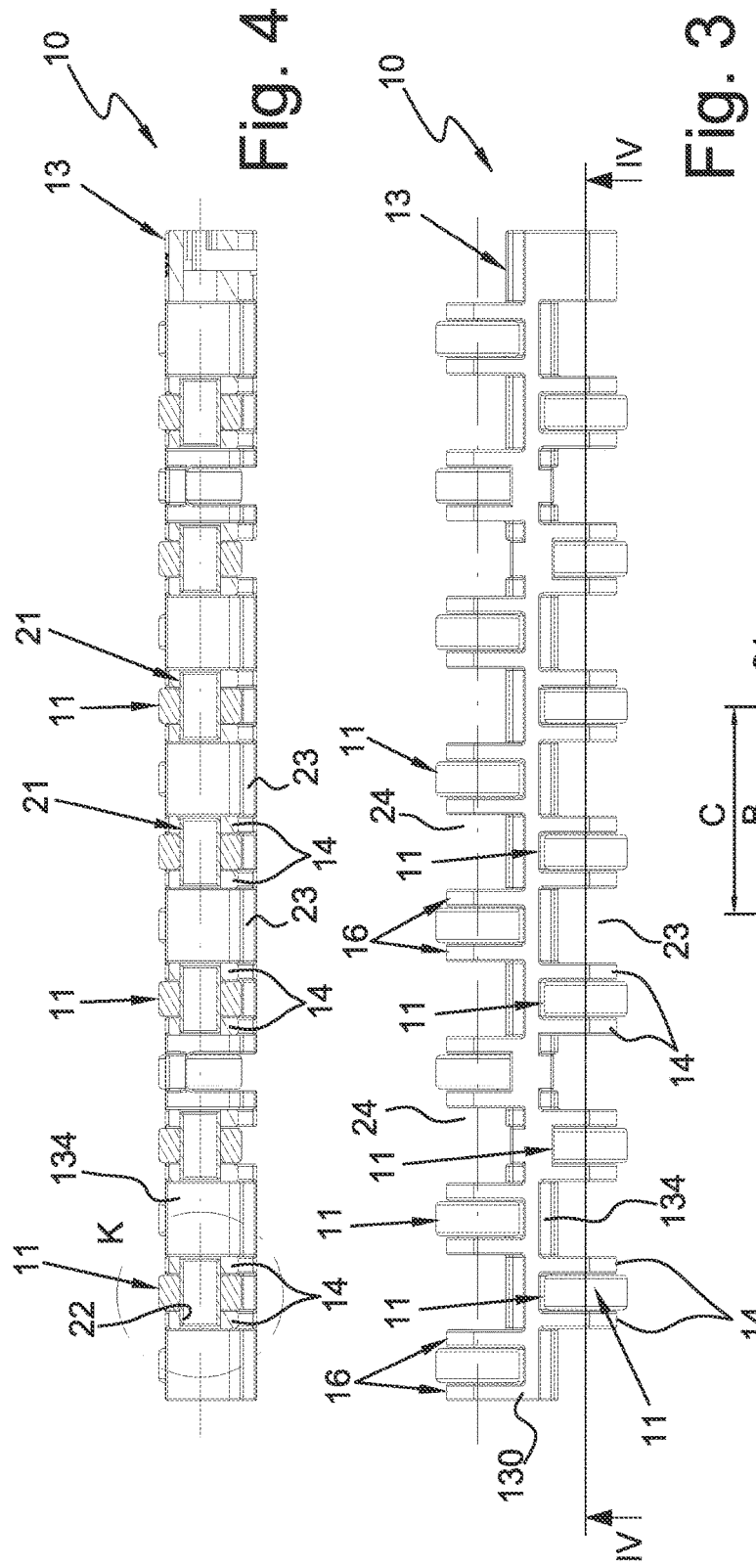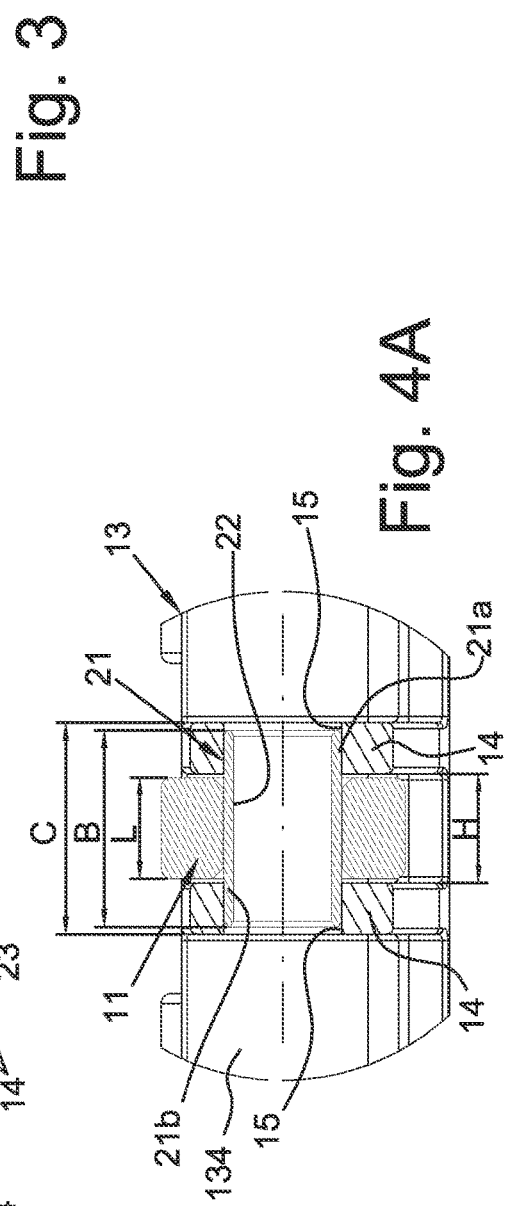

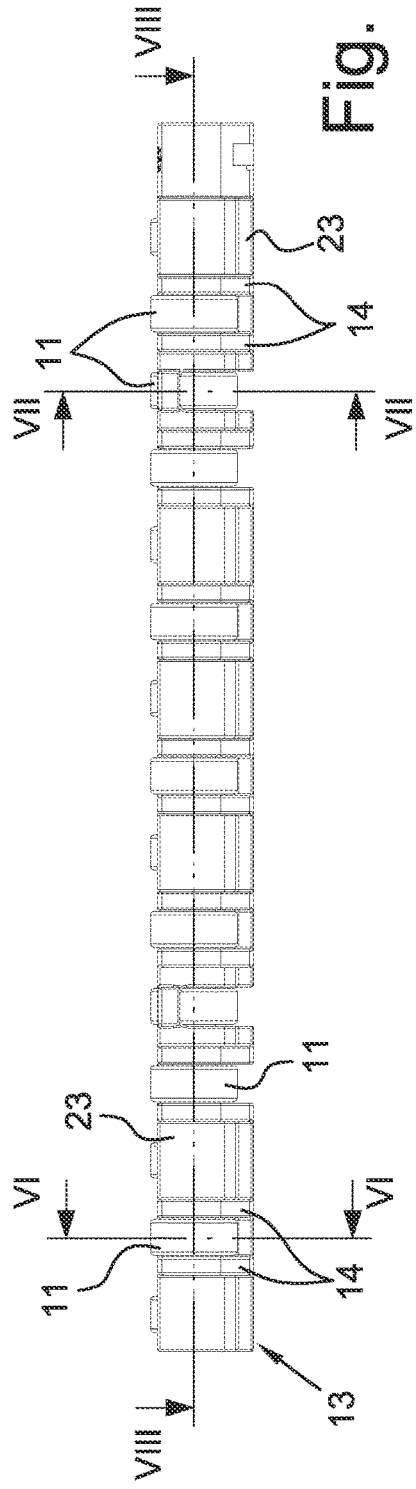
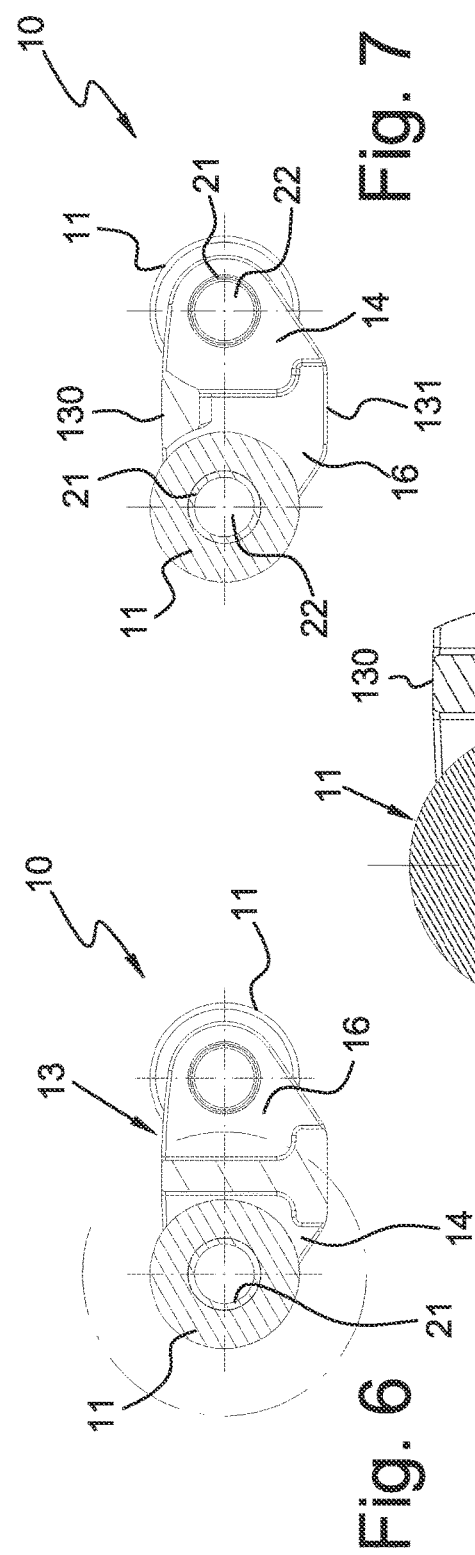
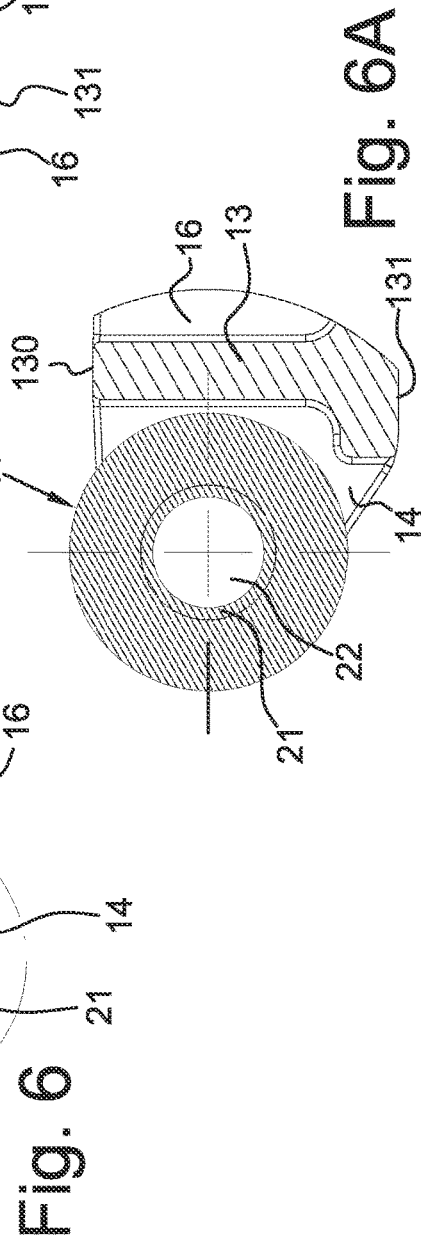

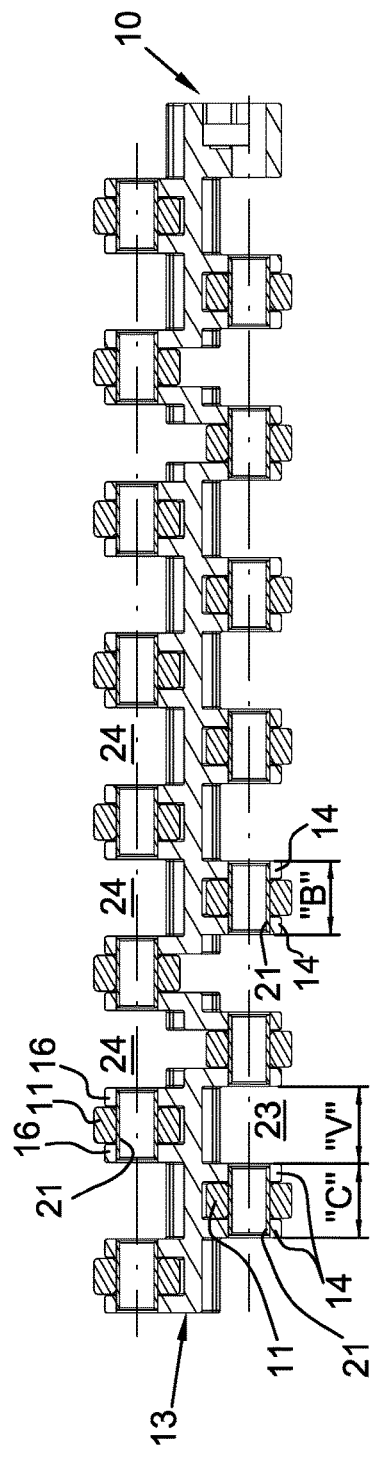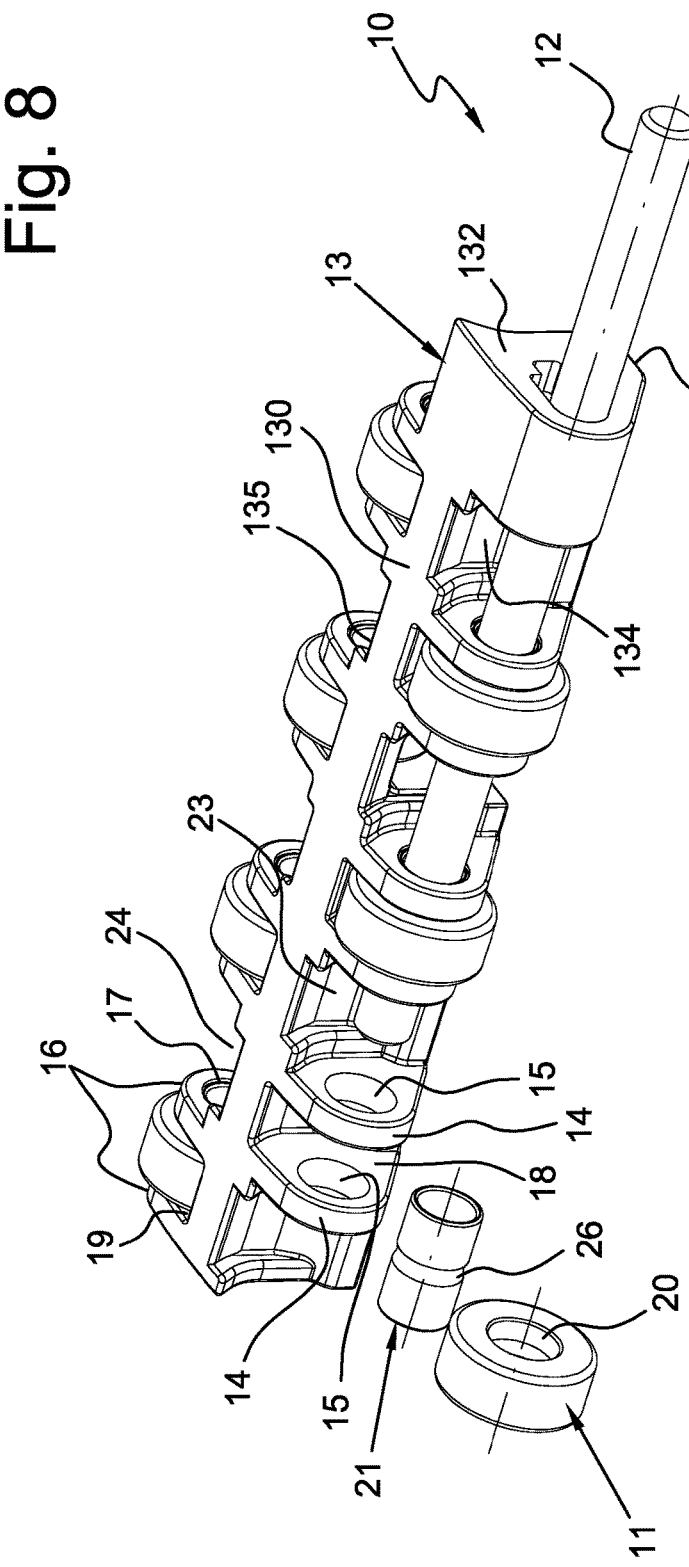

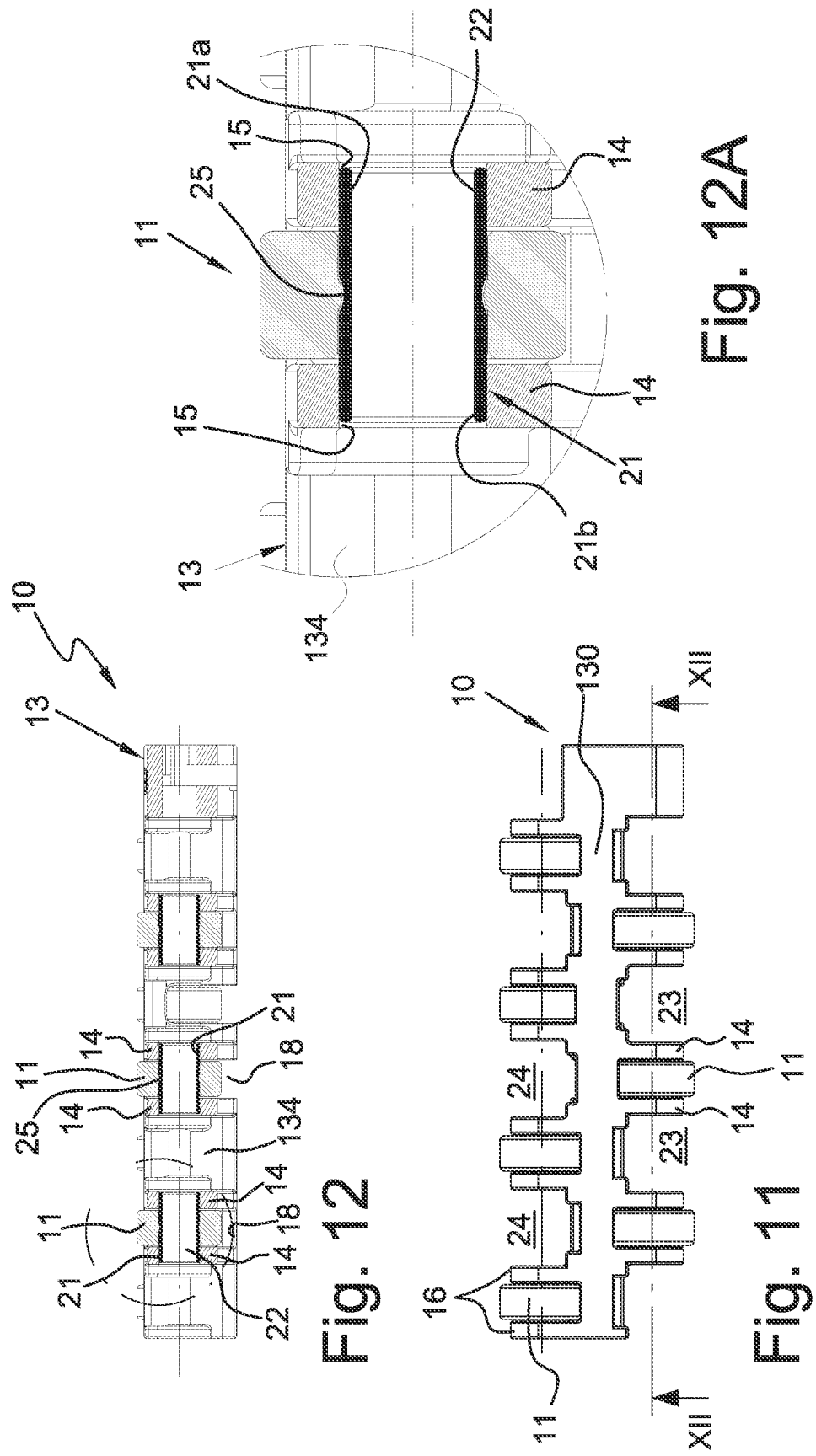

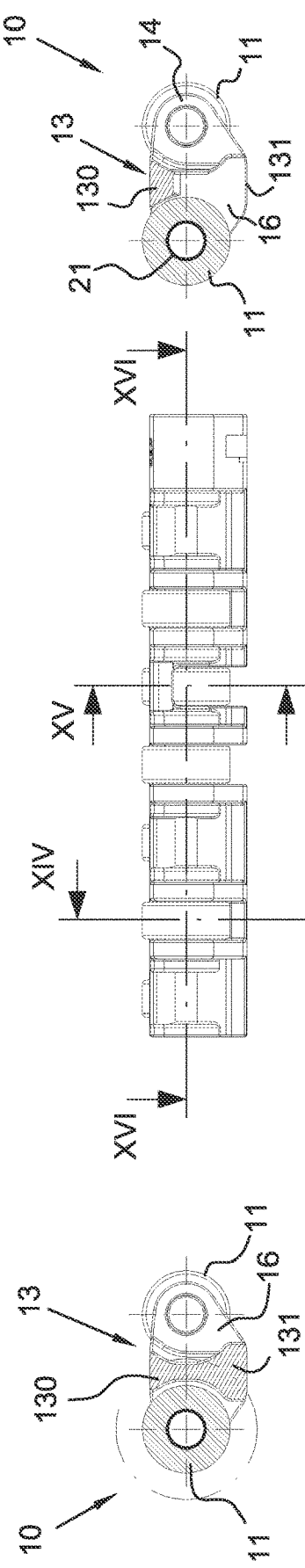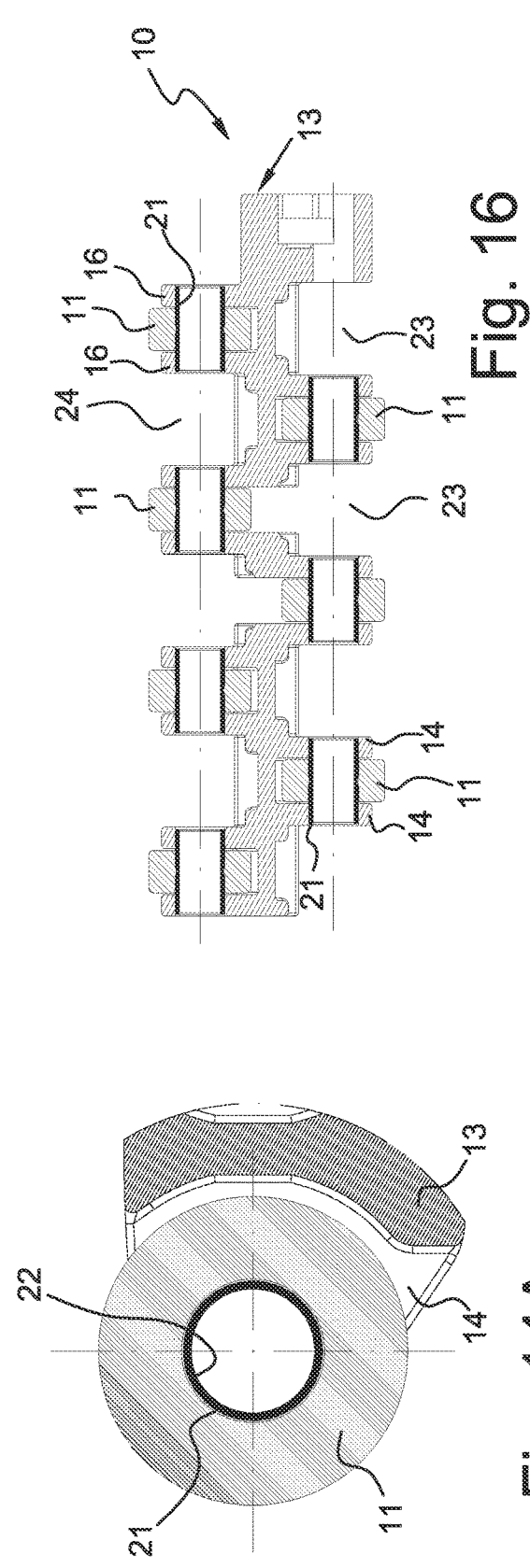

ROLLER MODULAR CONVEYOR BELT MODULE AND MODULAR CONVEYOR BELT FORMED BY A PLURALITY OF SUCH MODULES

CROSS-REFERENCE TO RELATED APPLICATIONS

This application is related to and claims the benefit of Italian Patent Application No. 102020000029087, filed on Nov. 30, 2020, the contents of which are herein incorporated by reference in their entirety.

TECHNICAL FIELD

The present disclosure relates to a modular roller conveyor belt module, in which the rollers are mounted on hinge pins articulating successive modules, for motorized continuous conveyors.

In particular, the present disclosure relates to a modular conveyor belt module with a roller transport surface, in which the rollers are mounted on hinge pins articulating successive modules and defining the transport surface on which the products to be transported rest.

The present disclosure also relates to a modular conveyor belt comprising a plurality of such modules.

BACKGROUND

In the field of motorized continuous conveyors, conveyor belts are known which are formed by a plurality of modules hinged to each other by means of hinge pins and whose transport surface or support surface on the support frame is defined by a plurality of rollers, in which the rollers are mounted on the hinge pins articulating successive modules to each other.

Each of such modules consists of a main body which, at a front surface and a rear surface with respect to the direction of movement of the conveyor belt, is provided with one or more hinge elements extending parallel to the direction of movement of the conveyor belt. Each of such hinge elements is passed through by a respective through hole to accommodate a hinge pin articulating the module with a successive module. The hinge pins extend in a direction orthogonal to the direction of movement of the conveyor belt.

A space is defined between two or more such adjacent hinge elements to accommodate at least one respective roller which is mounted directly on the hinge pin articulating such a module with another module adjacent thereto.

The rollers are thus embedded in the thickness of the main body of the module, projecting above and/or below it, and are mounted coaxially and rotatably on the hinge pins which articulate such a module with successive modules.

Examples of such modules are described in U.S. Pat. No. 7,527,146 (EP1842806) and U.S. Pat. No. 10,065,802 (EP3612474).

The assembly and disassembly of conveyor belts made with this type of module is particularly laborious and costly in terms of time and labour.

In fact, during assembly each roller must be arranged and held between the hinge elements of successive modules until the respective hinge pin has been inserted into the through holes of the hinge elements and the axial holes of each roller arranged therebetween. Similar problems occur if the conveyor belt must be disassembled or even if only a single module thereof must be replaced.

A solution to such problems is provided by a module as described in U.S. Pat. No. 7,527,146 (EP1842806). According to what is described in U.S. Pat. No. 7,527,146 (EP1842806), from at least one of the two faces facing each other of two hinge elements delimiting a space in which at least one respective roller is accommodated, a projecting extension is obtained in a single piece, which extension engages by elastic deformation in the axial hole of the respective roller when the latter is pushed into the respective space until it is aligned with the through holes of the two hinge elements delimiting such a space.

Such a solution makes it possible to hold the rollers on the main body of the module coaxially to the through holes of the hinge elements in the absence of the hinge pins, i.e., when the module is not hinged to other modules to form a conveyor belt.

In use, however, anomalies may arise when products are transported on the rollers or when the rollers come into contact with the support frame of the conveyor belt.

In fact, each roller holding extension extends into the axial hole of the respective roller only by a section at the end of the roller, which is specially made for this purpose.

When the modules are articulated with the hinge pins to form a conveyor belt, the rollers are mounted in a rotating manner directly (i.e., in direct contact) on the hinge pins.

As a result of wear and tear and deformation of the hinge pins, abnormal contact and sliding can occur between the holding extensions and the rollers themselves with the consequent friction which alters the correct rolling motion of the rollers and, therefore, the transport of the products or the sliding of the conveyor belt.

Furthermore, the construction of the holding extensions projecting from the facing faces of adjacent hinge elements in a single piece with the module main body requires the use of complex moulds.

SUMMARY

The present disclosure therefore provides a roller modular conveyor belt module for motorized continuous conveyors of the type with rollers mounted on hinge pins and a modular conveyor belt formed by a plurality of such modules which overcome the drawbacks of the prior art.

Within this advantage, the present disclosure provides a module which allows to hold the rollers on the main body of the module even in the absence of the hinge pins in a manner which is easy to achieve and assemble and which, at the same time, allows to ensure, in use, a correct rolling of the rollers in contact with the products resting thereon or with the support frame of the conveyor belt, eliminating the occurrence of localized and undesired friction.

The present disclosure further provides a module which allows to obtain conveyor belts having a substantially continuous roller transport surface, increasing the density of the rollers.

The present disclosure also provides a roller modular conveyor belt module and a modular conveyor belt formed by a plurality of said modules which are particularly simple and functional, at a low cost.

These advantages according to the present disclosure are achieved by providing a roller modular conveyor belt module, of the type with rollers mounted on hinge pins, and a modular conveyor belt as set forth in the independent claims.

Further features are comprised in the dependent claims.

BRIEF DESCRIPTION OF THE DRAWINGS

The features and advantages of a roller modular conveyor belt module, of the type with rollers mounted on hinge pins, and of a modular conveyor belt formed by a plurality of modules according to the present disclosure will be more apparent from the following description, which is to be understood as exemplifying and not limiting, with reference to the appended schematic drawings, in which:

FIG. 3 is a plan view from above of the module of FIG. 1;

FIG. 4 is a section according to plane IV-IV of FIG. 3;

FIG. 4A is an enlarged scale detail of FIG. 4;

FIG. 5 is a front view of the module of FIG. 1;

FIGS. 6, 7 and 8 are section views according to planes VI-VI, VII-VII and VIII-VIII of FIG. 5, respectively;

FIG. 6A is a view on an enlarged scale of a detail of FIG. 6;

FIG. 9 is an axonometric and partially exploded view of a second embodiment of a module, in particular a head module, according to the present disclosure in which a hinge pin is also shown;

FIG. 11 is a plan view from above of the module of FIG. 9;

FIG. 12 is a section according to the plane XII-XII of FIG. 11;

FIG. 12A is an enlarged scale detail of FIG. 12;

FIG. 13 is a front view of the module of FIG. 9;

FIGS. 14, 15 and 16 are section views according to planes VI-VI, VII-VII and VIII-VIII of FIG. 13, respectively; and FIG. 14A is a view on an enlarged scale of a detail of FIG. 14.

DETAILED DESCRIPTION OF THE DRAWINGS

Figure 1:
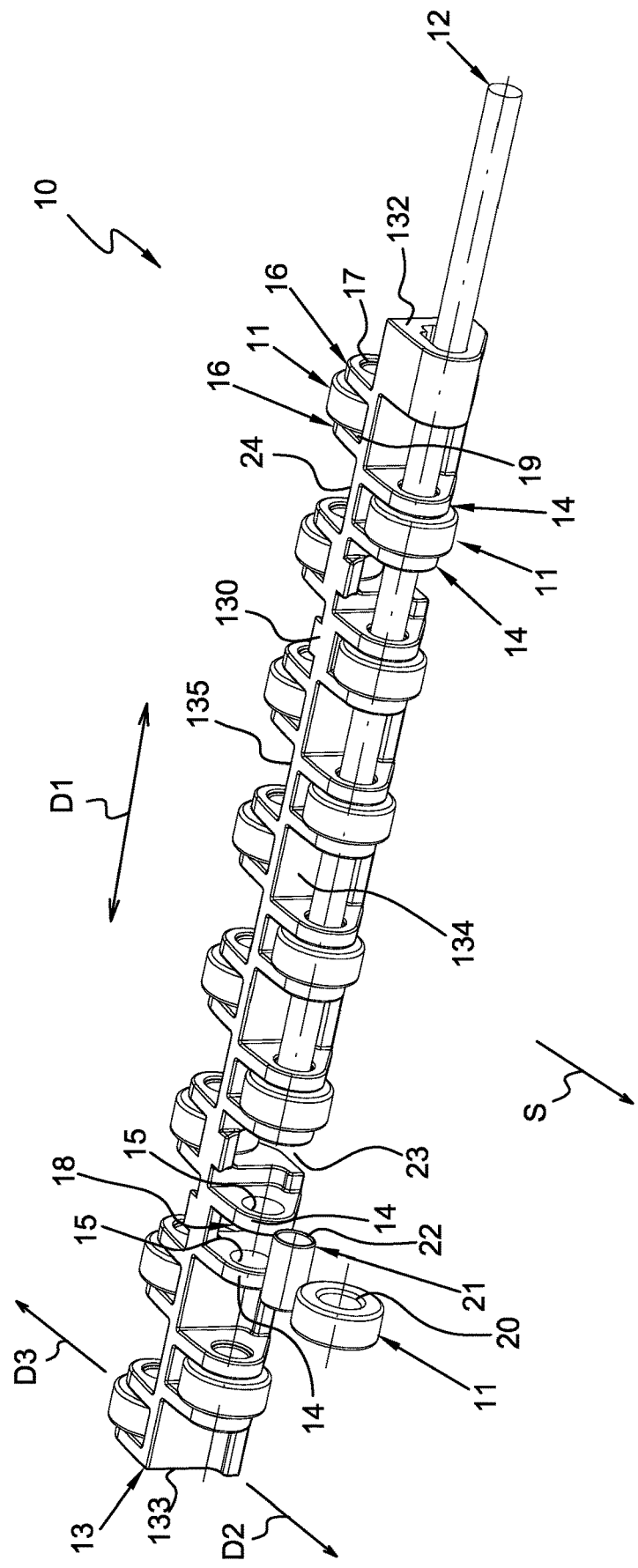
FIG. 1 is an axonometric and partially exploded view of a first embodiment of a module, in particular a head module, according to the present disclosure in which a hinge pin is also shown.
Figure 2:
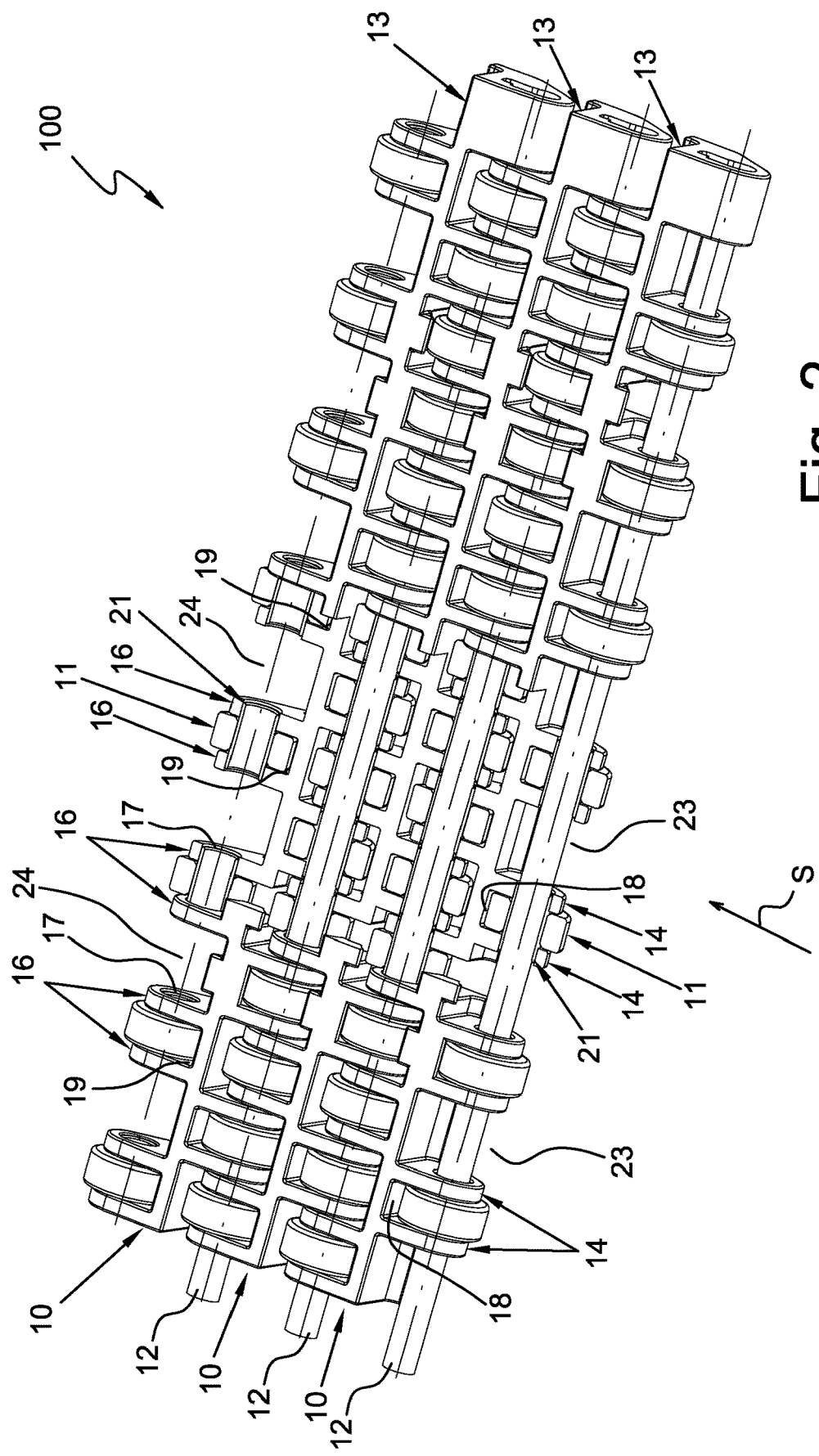
FIG. 2 is an axonometric and partial cutaway view of a section of a modular conveyor belt made with a plurality of modules according to FIG. 1.
Figure 10:
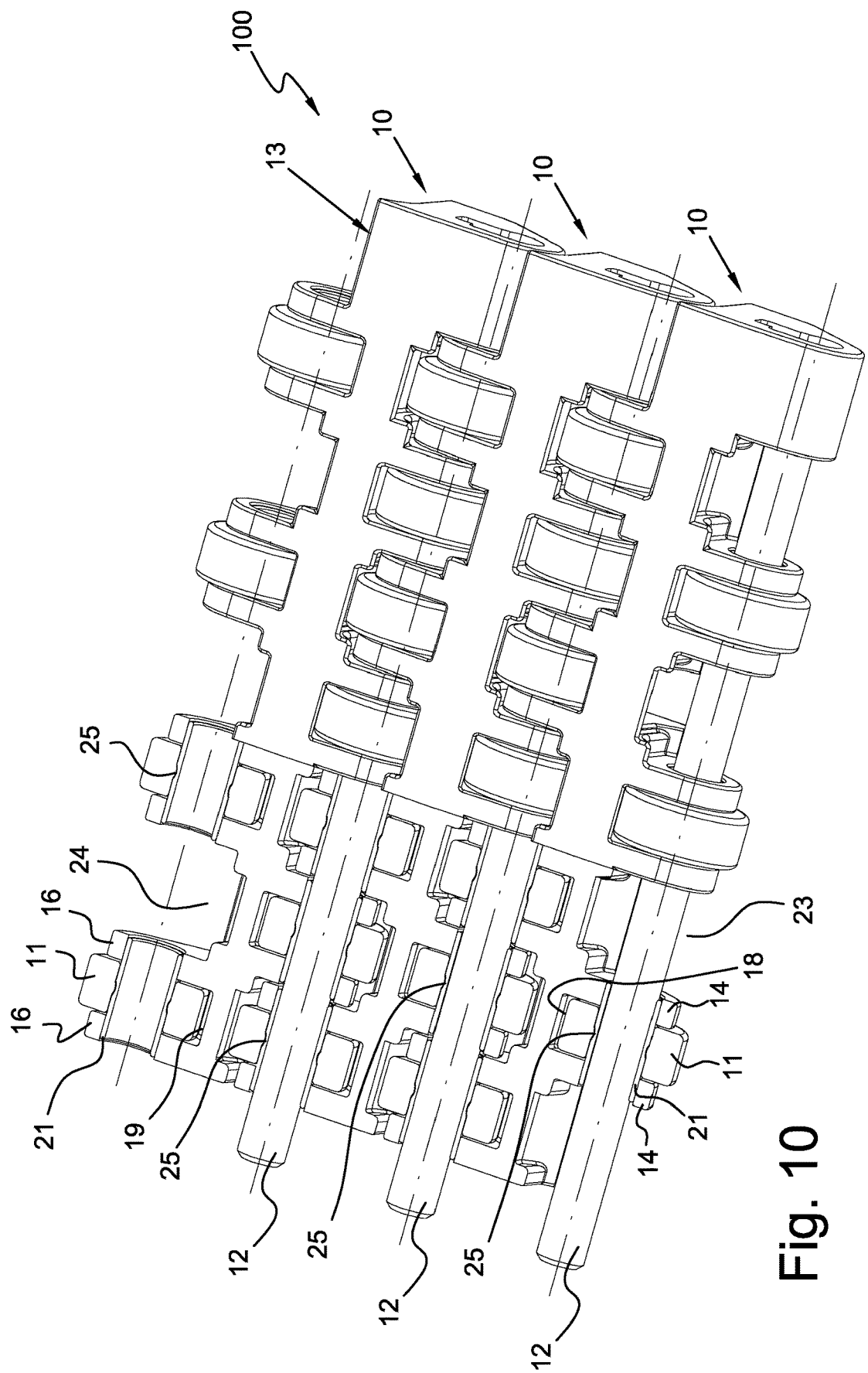
FIG. 10 is an axonometric and partial cutaway view of a section of a modular conveyor belt made with a plurality of modules according to FIG. 9.

With reference to the appended drawings, a roller 11 modular conveyor belt module is indicated by 10 and a modular conveyor belt is indicated by 100, the modular conveyor belt 100 being made by a plurality of modules 10 placed side by side in successive rows and in which the modules 10 of adjacent rows are articulated with each other to form a closed ring (not shown in its entirety in the appended drawings, in which FIGS. 2 and 10 show only a portion of the conveyor belt 100).

It should be noted that in this description adjectives such as "first" and "second" are for the sole purpose of clarity of exposition and should in no way be understood in a limiting sense. Equal numbers are used to designate corresponding elements.

Furthermore, in the present description, adjectives such as "front" and "rear", "upper" and "lower" refer to the usual conditions of use of the module 10 to form a closed-loop belt 100 driven in motion by a pair of gears and forming an upper branch for transporting products and a lower return branch.

The module 10 is used to make conveyor belts 100 which, for example, are used to transport bottles, cans or cartons individually or in groups.

The module 10 is used to make conveyor belts 100 in which the rollers 11 are mounted coaxially to the hinge pins 12 articulating adjacent modules 10 to each other in the direction of movement S of the conveyor belt 100.

The rollers 11 can form the transport surface of the products to make so-called LBP (Low Backline Pressure) conveyor belts 100. Such belts 100 are used, for example, to transport products and, at the same time, to make so-called buffers or accumulation zones for the products along the transport lines, leading them through successive stations of a processing and/or packaging plant. For example, such conveyor belts 100 (LBP) are used to make buffers or accumulation zones along the transport line between a packaging station and a palletising station.

Alternatively, the rollers 11 can form the support surface of the belt 100 on the support frame of the continuous conveyor belt.

The appended drawings refer to modules 10 for making conveyor belts 100 with conveying belt surface made up of rollers 11 (LBP).

Reference will first be made to the first embodiment of the module 10 shown in FIGS. 1 to 8.

The module 10 comprises a main body 13 extending in length along a first direction D1.

The first direction D1 is transverse, or rather orthogonal, to the direction of movement S of the conveyor belt 100.

A plurality of first hinge elements 14 extend from the main body 13 along a second direction D2 substantially orthogonal to the first direction D1. The second direction D2 is parallel to the direction of movement S.

The first hinge elements 14 are spaced apart and each has a through hole 15 with an axis parallel to the first direction D1. The through holes 15 of the first hinge elements 14 are coaxial to each other in order to receive therethrough a respective hinge pin 12 articulating the module 10 with another said module to form a conveyor belt 100.

A plurality of second hinge elements 16 extend from the main body 13 along a direction D3 parallel to and opposite the second direction D2. The second hinge elements 16 are spaced apart and each has a through hole 17 with an axis parallel to the first direction D1. The through holes 17 of the second hinge elements 16 are coaxial to each other in order to receive therethrough a respective hinge pin 12 articulating the module 10 with another said module to form a conveyor belt 100.

As is known, the first hinge elements 14 of a module 10 are adapted to interpose themselves between the second hinge elements 16 of another said module 10 adjacent thereto with respective through holes 15 and 17 coaxially aligned therebetween to accommodate a hinge pin 12 articulating the two subsequent modules to one another.

Between at least two adjacent first hinge elements 14 and/or between at least two adjacent second hinge elements 16, a respective space 18, 19 is defined in which at least one respective roller 11 is arranged.

In the appended drawings there is a single roller 11 in each space 18, 19. However, two or more coaxial rollers 11 can be accommodated in each space 18, 19.

Each roller 11 has an axial hole 20 which is aligned respectively with the axial holes 15 of the two adjacent first hinge elements 14 delimiting the space 18 in which it is accommodated or with the axial holes 17 of the two adjacent second hinge elements 16 delimiting the space 19 in which it is accommodated.

For each roller 11 or each set of rollers 11 accommodated in a respective space 18, 19, the module 10 comprises at least one respective bushing 21 adapted to retain the respective roller 11 or set of rollers 11 on the main body 13 in the absence of the respective hinge pin 12, i.e., when the module 10 is not hinged to other modules 10 adjacent thereto to form a conveyor belt 100.

In the following description, reference will be made to the embodiments shown in the appended drawings, where only one roller 11 is present in the spaces 18, 19. However, as mentioned above, two or more rollers 11 can be present in the space 18, 19 delimited by two first hinge elements 14 or by two second hinge elements 16; in such a case, as it is immediately understandable to the skilled person, the same bushing 21 can be used to support the two or more rollers 11 received in the same space 18, 19.

Each bushing 21 retains the at least one respective roller 11 with the respective axial hole 20 aligned respectively with the through holes 15 of the adjacent first hinge elements 14 or with the through holes 17 of the adjacent second hinge elements 16 delimiting the space 18, 19 in which it is accommodated.

Each bushing 21 is passed through by a respective axial hole 22 which, as will be seen, is capable of receiving a respective hinge pin 12 with clearance.

Each bushing 21 consists of a cylindrical tubular body and has a constant transverse section along its longitudinal length, except for the countersink at the opposite ends of its axial hole 22.

Each bushing 21 has a first end portion 21a and a second end portion 21b axially opposite each other.

Each bushing 21 has a first end portion 21a which is inserted into the through hole 15, 17 of one of the two adjacent first hinge elements 14 and/or the two adjacent second hinge elements 16 delimiting the space 18, 19 in which the respective at least one roller 11 is arranged and extends through the axial hole 20 of the respective at least one roller 11.

Advantageously, each bushing 21 has the second end portion 21b which is inserted in the through hole 15, 17 of the other of the two adjacent first hinge elements 14 and/or two adjacent second hinge elements 16 delimiting the space 18, 19 in which the respective at least one roller 11 is arranged.

Advantageously, each bushing 21 passes through the axial hole 20 of the respective at least one roller 11 and has the first end portion 21a and the second end portion 21b which are inserted in the through holes 15, 17 of the two adjacent first hinge elements 14 and/or of two adjacent second hinge elements 16 delimiting the space 18, 19 in which the respective at least one roller 11 is arranged.

The axial hole 22 of each bushing 21 accommodates the hinge pin 12 which articulates successive modules 10 with clearance. Clearance is defined as the difference between the maximum diameter of the hinge pin and the minimum diameter of the hole of the bushing 21, which allows the free articulation of the modules 10 and also enables easy assembly.

In the first embodiment shown in FIGS. 1 to 8, the first end portion 21a and the second end portion 21b of each bushing 21 is interference fit coupled in the respective through hole 15, 17 of the two adjacent first hinge elements 14 and/or two adjacent second hinge elements 16 delimiting the space 18, 19 in which the respective at least one roller 11 is arranged. Interference fit coupling is defined as the condition whereby the bushing 21 is joined to the modules 13.

Between the axial hole 20 of each roller 11 and the respective bushing 21, a coupling clearance is defined so that each roller 11 is assembled on the respective bushing 21 in a rotatable manner with respect thereto. Coupling clearance is defined as the difference between the maximum external diameter of the bushing 21 and the minimum internal diameter of the roller 11 allowing the free mutual rolling thereof.

Next to at least one of the two first hinge elements 14 and/or at least one of the two second hinge elements 16 delimiting each space 18, 19 there is a compartment, respectively a first compartment 23 and a second compartment 24, adapted to respectively accommodate at least one second hinge element 16 or at least one first hinge element 14 of another said module 10.

In order to enable the assembly of the module 10 (i.e., the rollers 11 on the respective main body 13), each bushing 21 has a length B greater than the length L of the respective at least one roller 11 and less than or equal to the width V, measured parallel to the axis of the through holes 15, 17 (i.e., parallel to the first direction D1), of the respective first compartment 23 or second compartment 24.

Furthermore, each bushing 21 has a length B greater than the length L of the respective at least one roller 11 and less than or equal to the distance C between the opposite faces of the two adjacent first hinge elements 14 and/or the two adjacent second hinge elements 16 delimiting the space 18, 19 in which the respective at least one roller 11 is accommodated, in which the distance C is measured parallel to the axis of the through holes 15, 17 (i.e., parallel to the first direction D1).

Each roller 11 is fully supported along its entire length L by a respective bushing 21.

The length L of the at least one roller 11 is less than the distance H between the faces facing each other of the two adjacent first hinge elements 14 and/or the two adjacent second hinge elements 16 delimiting the space 18, 19 in which it is received, in which the distance H is measured parallel to the axis of the through holes 15, 17 (i.e., parallel to the first direction D1).

Each bushing 21 is made as a separate and distinct element from the main body 13, to which it is coupled when the rollers 11 are assembled on the latter, so as to make a module 10 complete with rollers 11. Once assembled, each module 10 comprises the main body 13 on which the rollers 11 are supported by means of the respective bushings 21. The rollers 11 are thus supported by the main body 13 of each module 10 in the absence of the hinge pin 12 which articulates the latter to other modules 10 to form a conveyor belt 100.

The hinge pins 12 are accommodated in the bushings 21. The hinge pins 12 are then received in the through holes 15, 17 of the first hinge elements 14 and the second hinge elements 16 with interposition of the bushings 21 which hold the rollers 11 on the main body 13.

In more detail, the main body 13 has an upper surface 130 and a lower surface 131 which are connected to each other by a pair of lateral surfaces 132, 133, a front surface 134 and a rear surface 135.

The two lateral surfaces 132, 133 extend along planes substantially orthogonal to the first direction D1.

The front surface 134 and the rear surface 135 extend along the longitudinal extension of the main body 13.

The first hinge elements 14 are obtained projecting from the front surface 134.

The second hinge elements 16 are obtained projecting from the rear surface 135.

In the embodiment shown in FIGS. 1 to 8, the main body 13 and the rollers 11 are shaped and dimensioned so that the rollers 11 project with a portion thereof above the upper surface 130 of the main body 13 so as to act as support elements for the products to be transported with a conveyor belt 100 (LBP).

In a possible embodiment, the first hinge elements 14 are distributed in pairs along the first direction D1. The first two hinge elements 14 of each of said pairs delimits a respective space 18 in which at least one respective roller 11 supported by a respective bushing 21 is arranged.

Successive pairs of first hinge elements 14 are spaced apart from each other by a respective first compartment 23 adapted to accommodate at least one second hinge element 16 of another adjacent module 10.

Similarly, in a possible embodiment the second hinge elements 16 are distributed in pairs along the first direction D1. The two second hinge elements 16 of each of said pairs delimit a respective space 19 in which at least one respective roller 11 supported by a respective bushing 21 is arranged. Successive pairs of second hinge elements 16 are spaced apart from each other by a respective second compartment 24 capable of accommodating at least a first hinge element 14 of another adjacent module 10.

In the embodiment shown in FIGS. 1 to 8, both the first hinge elements 14 and the second hinge elements 16 are distributed in pairs as defined above, in which the pairs of the first hinge elements 14 and the pairs of the second hinge elements 16 are staggered from each other.

However, alternative embodiments are not excluded. For example, only some of the first hinge elements 14 and/or the second hinge elements 16 could be spaced so as to delimit a respective space 18, 19 in which at least one respective roller 11 is accommodated.

The main body 13 is made of plastic, obtained for example by injection moulding.

The bushings 21 are made of thermoplastic material. Alternatively, the bushings 21 are made of metallic material, for example steel.

The hinge pins 12 can be made of plastic or metal.

As it is immediately understandable to the skilled person, the assembly of the module 10 occurs:

placing each roller 11 (or set of rollers 11) in the respective space 18 or 19, aligning the axial hole 20 with the through holes 15 or 17 respectively of the first hinge elements 14 or the second hinge elements 16 delimiting the space 18 or 19;

arranging for each roller 11 (or set of rollers 11) a corresponding bushing 21 in the first compartment 23 or in the second compartment 24 immediately adjacent to the space 18 or 19 in which it is accommodated, aligning it coaxially with the through holes 15 or 17 of the first hinge elements 14 or the second hinge elements 16 delimiting the space 18 or 19;

exerting an axial thrust action on each bushing 21 so as to insert it by axial sliding in the through holes 15 or 17 of the first hinge elements 14 or of the second hinge elements 16 delimiting the space 18 or 19 passing through the axial hole 20 of the roller 11 arranged in said space 18 or 19, as long as the first end portion 21a and the second end portion 21b of each bushing 21 are inserted in the through holes 15 or 17 of the first hinge elements 14 or of the second hinge elements 16 delimiting the space 18 or 19, so that each roller 11 (or set of rollers 11) is rotatably supported by a respective bushing 21 holding it on the main body 13 in the absence of the hinge pin 12.

Once assembled, each bushing 21 has the respective first end 21a and second end 21b extending outside the roller 11 assembled thereon and inserted in the through holes 15, 17 of the two first hinge elements 14 or the two second hinge elements 16 delimiting the space 18, 19 in which the respective roller 11 is accommodated.

The assembly of the conveyor belt 100 occurs by arranging the modules 10 one in succession to the other with the first hinge elements 14 or pairs of first hinge elements 14 interspersed with the second hinge elements 16 or pairs of second hinge elements 16 of an adjacent module 10 so that the through holes 15 of the first, and along with them the axial holes 22 of the bushings 21 inserted therein, are coaxially aligned with the through holes 17 of the second hinge elements, and along with them the axial holes 22 of the bushings 21 inserted therein, and by inserting a hinge pin 12 in the axial holes 22 of the bushings 21 so aligned so as to articulate successive modules 10 two by two.

Along the first direction D1, two or more modules 10, even of different lengths, can be arranged side by side to form a row of conveyor belt 100. In this case, the hinge pins 12 extend between modules 10 side by side.

As can be seen in FIGS. 2 and 10, the hinge pins 12 are accommodated in the axial holes 22 of the bushings 21 supporting the rollers 11.

The bushings 21 of two successive modules 10 follow each other along the first direction D1 in a substantially continuous manner.

Under operating conditions, the rollers 11 rotate with respect to the bushings 21, while the hinge pins 12 rotate with respect to the bushings 21. There is no direct contact between the hinge pins 12 and the rollers 11.

Each roller 11 is fully supported along its entire length L by a respective bushing 21, any contact anomalies which may arise between the bushings 21 and the hinge pins 12—anomalies which, for example, may result from wear or deformation of the hinge pins 12—do not affect the rotatable coupling of the rollers 11 on the bushings 21 and, in particular, the coefficient of friction between the rollers 11 and the bushings 21. This means that there are no anomalies in the transport of the products on the rollers 11 or in the sliding of the conveyor belt on the frame.

Disassembly occurs by reversing the operations described above.

The second embodiment shown in FIGS. 9 to 16 differs from the first embodiment in the dimensions of the module 10 and in the fact that in this case each bushing 21 has a respective first end portion 21a and/or a respective second end portion 21b which is coupled with clearance in the respective through hole 15, 17 of the two first hinge elements 14 and/or the two second hinge elements 16 delimiting each space 18, 19 in which at least one respective roller is accommodated.

Clearance is defined as the condition whereby the bushing 21 is not held in position by interference with the holes 15, 17.

In such a case, at least one radial projection 25 is formed on the internal lateral surface of the axial hole 20 of the at least one roller 11, which is coupled to a corresponding recess 26 obtained on the external lateral surface of the respective bushing 21 or vice versa to block the relative axial sliding of the roller 11 and the bushing 21.

In the embodiment shown in the appended drawings, the projection 25 comprises an annular collar and the recess 26 comprises an annular groove, the former engaging in the latter upon the axial sliding insertion of the bushing 21 in the axial hole 20 of the respective roller 11.

Otherwise, the module 10 of the second embodiment is the same as that of the first embodiment.

In practice, the roller modular conveyor belt module and the modular roller conveyor belt comprising a plurality of such modules have been found to achieve the proposed advantages.

In fact, the rollers 11 are held on the main body 13 of the module 10 in a manner aligned with the hinge holes (through holes 15, 17) even in the absence of the hinge pins 12, which allows for easy assembly and disassembly of the conveyor belt 100.

The bushings 21 by means of which the rollers 11 are held on the main body 13 are interposed between the hinge pins 12 and the rollers 11 along their entire length; thereby, any abnormal contacts or frictions which may be generated between the bushings 21 and the hinge pins 12, for example as a result of wear or deformation of the latter, do not directly affect the rotatable coupling of the rollers 11 on the bushings 21 and, therefore, the rolling friction between the rollers 11 and the products they carry or the frame on which they roll.

The moulds for obtaining the main body 13 are also simpler than the known art identified.

The roller modular conveyor belt module and the modular conveyor belt thus conceived are susceptible to numerous modifications and variants, all of which are within the scope of the disclosure; furthermore, all details are replaceable by technically equivalent elements. In practice, the materials used, as well as their dimensions, can be of any type according to the technical requirements.

The invention claimed is:

1. A roller modular conveyor belt module for motorized continuous conveyors, said module comprises:
   a main body extending in length along a first direction,
   a plurality of first hinge elements extending from said main body along a second direction substantially orthogonal with respect said first direction and spaced apart from each other, wherein each one of said first hinge elements has a through hole with an axis parallel with respect to said first direction, said through holes being coaxial each other to receive a respective hinge pin articulating said module with another said module;
   a plurality of second hinge elements extending from said main body along a direction parallel and opposed with respect to said second direction and spaced apart each other, wherein each one of said second hinge elements has a through hole having axis parallel with respect to said first direction, said through holes being coaxial each other to receive a respective hinge pin articulating said module with another said module;
   wherein said first hinge elements are configured to interpose between second hinge elements of another said module with the respective through holes aligned each other to receive a hinge pin articulating said modules each other;
   wherein:
   in the space between at least two of said first hinge elements adjacent each other and/or between at least two of said second hinge elements adjacent each other a respective roller is disposed, wherein said roller is passed through by an axial hole coaxial with respect to the through holes of said at least said first adjacent hinge elements and/or of said at least two adjacent hinge elements delimiting said space;
   and in that said module further comprises
   at least a bushing having a first end portion inserted into the through hole of one of said two first adjacent hinge elements and/or of said second adjacent hinge elements delimiting said space, wherein said bushing extends through the axial hole of said at least one roller, said bushing holding said roller on said main body and being suitable for receiving through it a respective hinge pin interposing between said hinge pin and said through holes and between said hinge pin and said at least one roller.

2. The module according to claim 1, wherein said at least one bushing has a second end portion which is axially opposite with respect to said first end portion and which is inserted in the through hole of the other of said two first adjacent hinge elements and/or of said two second adjacent hinge elements delimiting said space, said bushing crossing the axial hole of said at least one roller.

3. The module according to claim 2, wherein said first end portion and/or said second end portion of said at least one bushing is interference fit coupled in the respective through hole of said two first adjacent hinge elements and/or of said two second adjacent hinge elements delimiting said space.

4. The module according to claim 2, wherein said first end portion and/or said second end portion of said at least one bushing is coupled with clearance in the respective through hole of said two first adjacent hinge elements and/or of said two second adjacent hinge elements delimiting said space.

5. The module according to claim 1, wherein at least one radial projection is formed on the internal lateral surface of the axial hole of said at least one roller, said projection being coupled to a corresponding recess obtained on the external lateral surface of said bushing or vice versa to block the relative axial sliding of said roller and said bushing.

6. The module according to claim 5, wherein said projection is comprised of an annular collar and said recess is comprised of an annular groove.

7. The module according to claim 1, wherein a coupling clearance is defined between said axial hole of said at least roller and said respective bushing, said roller being rotatably mounted on said bushing.

8. The module according to claim 1, wherein alongside at least one of said two adjacent first hinge elements and/or at least one of said two adjacent second hinge elements delimiting said space a compartment is disposed and being adapted to accommodate respectively at least one second hinge element or at least one first hinge element of another said module, wherein said bushing has a length lower than or equal to the width, measured parallel to the axis of said through holes, of said space and greater than the length of said roller.

9. The module according to claim 1, wherein said bushing has a length greater than the length of said roller and lower than or equal to the distance between the opposite faces of said two first hinge elements adjacent and/or of said two adjacent second hinge elements delimiting said space, said distance being measured parallel to the axis of said through holes.

10. The module according to claim 1, wherein said first hinge elements are distributed in pairs along said first direction, wherein the two first hinge elements of each pair delimit a respective space wherein at least one respective roller is arranged, supported by a respective said bushing and wherein successive pairs of said first hinge elements are spaced each other by a respective first compartment adapted to receive at least a second hinge element of another said adjacent module.

11. The module according to claim 1, wherein said second hinge elements are distributed in pairs along said first direction, wherein the two second hinge elements of each pair delimit a respective space wherein at least one respective roller supported by a respective said bushing is arranged and wherein successive pairs of said second hinge elements are spaced each other by a respective second compartment adapted to receive at least a first hinge element of another said adjacent module.

12. The module according to claim 10, wherein said pairs of first hinge elements and said pairs of second hinge elements are offset from each other.

13. The module according to claim 1, wherein said main body has an upper surface and a lower surface, wherein said at least one roller projects with at least one of its portion beyond said upper surface or said lower surface.

14. A modular roller conveyor belt comprising a plurality of modular conveyor belt modules according to claim 1 arranged one in succession to the other along a direction of movement wherein said first hinge elements and said second hinge elements of each one of said modules are interposed respectively with the second hinge elements and the first hinge elements of the modules directly adjacent, a plurality of said hinge pins inserted in the through holes of said first hinge elements and of said second hinge elements thus interposed each other of said modules directly adjacent, wherein said hinge pins extend through said bushings (21) supporting said rollers.

15. The modular roller conveyor belt according to claim 14, wherein said hinge pins extend with clearance in the axial hole of said bushings supporting said rollers, said hinge pins being able to rotate with respect to said bushings.

* * * * *